March 3, 1959

J. BRITT 2,876,033

GRIPPING DEVICES

Filed March 5, 1956

March 3, 1959 — J. BRITT — 2,876,033
GRIPPING DEVICES
Filed March 5, 1956 — 2 Sheets-Sheet 2

United States Patent Office 2,876,033
Patented Mar. 3, 1959

2,876,033

GRIPPING DEVICES

Jack Britt, Tollerton, England, assignor to Rolls-Royce Limited, Derby, England, a British company Application March 5, 1956, Serial No. 569,551

Claims priority, application Great Britain March 15, 1955

11 Claims. (Cl. 294—88)

This invention relates to gripping devices for use in the manipulation of objects, and has for an object to provide a form of gripping device which can be controlled remotely as to its engagement with and disengagement from an object to be manipulated.

According to the present invention, a gripping device comprises a chamber having a rigid annular wall structure and a resiliently-flexible, dished wall secured by its edge to said annular wall, and a plurality of claws secured to the dished wall at positions offset from and angularly spaced about the centre of the dished wall, said claws extending externally of the chamber generally in the direction of the normal to the dished wall at its centre when the wall is concave outwards, and said claws having gripping portions at their free ends, conduit means leading to the chamber, the conduit means conveying to the chamber a fluid under a pressure different from the pressure externally of the chamber whereby when the pressure within the chamber is less than the external pressure by a predetermined amount the dishing of the wall is concave outwards, and when the pressure within the chamber exceeds the external pressure by a predetermined amount the dished disc is deformed to reduce its outward concavity and the claws are displaced angularly in a sense away from said normal.

According to a preferred feature of this invention, the claws have portions extending within the chamber and adapted to engage the rigid annular wall structure and to transmit loads along the line of the normal to the rigid wall structure of the chamber. For example, if an object is held by the claws when pressure fluid is supplied to the chamber and it is desired to move the object in a sense to tend by the resultant loads to increase the curvature of the dished wall and thereby to tend to overstrain the dished wall, the portions of the claws within the chamber may be provided with abutment faces which are directed towards the dished wall and which come into engagement with oppositely-facing abutment surfaces on the rigid annular wall structure when the dished wall is moved towards the "convex outward" position. In this way the resultant loads will be transmitted to the rigid wall structure and overloading of the dished wall will be avoided.

In one arrangement according to this feature of the invention, in which leakage of the pressure fluid, say air, from within the chamber of the gripping device is to be avoided to prevent contamination of a controlled atmosphere within, say, chemical apparatus in which the device is situated, the claws are made each in two parts which are secured as by brazing to the opposite surfaces of the dished wall, whereby the provision of holes in the wall for the passage of the claws and consequent sealing difficulties are avoided. In this particular arrangement the portions of the claws within the chamber are hooked at their ends to afford the load abutment faces and the chamber has a rigid wall, opposite the resiliently-flexible wall, with a central projection having an annular flange affording the cooperating abutment surfaces.

According to another feature of this invention, means may be provided to indicate when the flexible, dished wall has been deformed towards the "convex outward" position comprising a valve member carried by the flexible wall and controlling a pressure fluid outlet to a flow-indicating device. In one position of the wall, the valve member allows a flow of the pressure fluid from the chamber and in the other position the flow is restricted or cut off. In the particular arrangement above set forth, the projection may have an outlet port formed in it facing the dished wall, the valve member on the dished wall closing off the port until the wall is moved towards the "convex outward" position.

According to yet another feature of this invention, the rigid wall structure of the chamber may be accommodated in and have abutment against a mounting body, the abutment surfaces of the rigid wall structure and the mounting body facing in the directions of load application, and the rigid wall structure and mounting body being connected together by a flexible bellows permitting separation of the abutment surfaces, the bellows being adapted to be supplied internally with a fluid whereof the pressure is lower than the pressure of the atmosphere in which the device is operating. Thus normally the abutment between the chamber structure and mounting body is maintained, but should the load applied to the gripping device in manipulating an object become excessive the abutment surfaces separate, and this separation may be employed to give an overload signal. For instance, the flow of pressure fluid through the bellows may be varied by the separation and a flow-measuring means may be used to indicate the variation of this flow.

One embodiment of gripping device will now be described with reference to the accompanying drawings in which.

Figure 1:
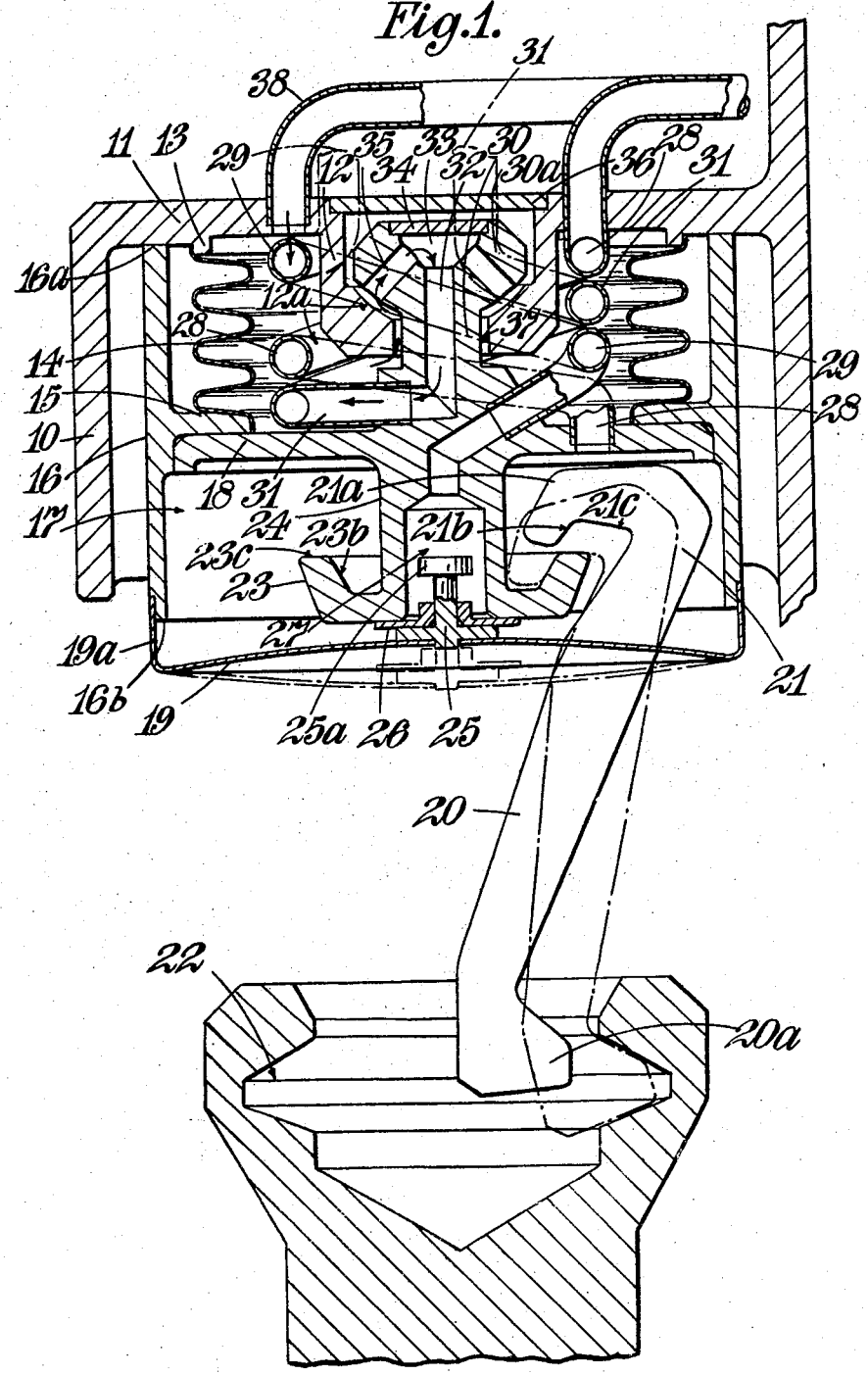
Figure 1 is a section through the gripping device.

The gripping device comprises a mounting body which may for instance be supported at the end of a manipulating arm by which the gripping device is brought to its operative position.

The mounting body has a substantially cylindrical wall 10 and an end wall 11 with a central hollow boss 12 projecting into the body and an annular rib 13 encircling the boss 12 but within the wall 10.

The rib 13 has secured to it one end of a metallic bellows 14 and the other end of the bellows is secured to an annular flange 15 projecting radially inwards from about the mid-length of a cylindrical member 16. One end portion of the member 16 encloses the bellows, and its end face 16a forms an abutment surface by which the member normally bears against the end wall 11 of the mounting body. The other end portion 16b forms a rigid annular wall of a chamber 17, whereof one end wall is formed by a rigid disc 18 fixed to the member 16, and the other end wall is formed by a resiliently-flexible dished disc 19 having a peripheral flange 19a by which it is secured to the member 16.

The disc 19 has secured to it, at points equally spaced around its centre, three claws, each of which is made in two parts 20, 21 brazed by their ends to the opposite surfaces of the disc 19. (For clarity, only one claw is shown in Figure 1.) The claw parts 20 extend generally in the direction of the normal to the disc 19 at its centre, and each claw part 20 has at its free end a tapered nose 20a by which it engages an annular groove 22 in the object to be manipulated. The part 21 has a hooked end 21a with surfaces 21b, 21c, to co-operate with corresponding surfaces 23b, 23c on an annular flange 23 formed on the end of a hollow projection 24 provided centrally of the rigid disc 18 to project into the chamber 17. The disc 19 also has secured to its inner surface a stud 25 which has a flanged head 25a and carries a plate valve element 26, which when the disc 19 is concave outwards (as shown in full lines) co-operates with the bore 27 of the hollow projection 24 to close the end of the bore.

A helical pressure fluid supply connection 28 encircling the boss 12 leads to the chamber 17 and a helical outlet connection 29 also encircling the boss 12 leads from the bore 27 to a flow-indicating device. When the supply of pressure fluid is cut off, the disc 19 is in the full line position and the noses 20a of the claws 20 are disengaged from the groove 22, and the hooked ends 21a of claws are clear of the flange 23. When the pressure of the fluid supplied to the chamber 17 becomes greater than the external pressure, the disc 19 is moved to the convex outward position (shown in chain lines), and the claws move angularly to a position in which the noses 20a engage with the groove 22 in the object to be manipulated and the hooked ends 21a cooperate with the flange 23. With the parts in this position, the surfaces 21b, 21c of the claws co-operate in abutment with the surfaces 23b, 23c of the flange 23 and thus serve to transmit loads which result from manipulation of the object and are due, for example to its weight, to the rigid parts 16, 18 of the walls of the pressure chamber 17, so relieving the resiliently-flexible wall 19.

Also the plate valve 26 is carried clear of the end of the bore 27 by the head 25a of the stud 25 so allowing a flow of pressure fluid through the outlet 29 to the flow-indicating device, and giving an indication that the object to be manipulated is gripped.

The disc 18 has a second boss 30 which projects into the hollow boss 12 on the end wall 11 of the mounting body, and the boss 30 has an enlarged head 30a which has a substantially less dimension at right angles to the plane of the drawing and which has a part-spherical undersurface to co-operate with a corresponding surface 12a in the bore of the hollow boss 12. The boss 30 has a central passage 32 leading to a fluid outlet pipe 31 from a chamber 33 in the head of the boss, and the chamber is closed by a plate 34 and has a pair of inlet passages 35 leading to it from the part-spherical undersurface. The opposite end of the bore in the hollow boss 12 is closed by a plate 36. The neck of the boss 30 occupies a slot 37 which is of such dimensions as to permit the insertion of the head 30a of the boss in assembly. After insertion, the boss is turned through 90° to the position shown. The neck of boss 30 has a clearance from the walls of the slot 37 to provide a passage leading from the space within the bellows 14 to the spherical surfaces. A pressure fluid supply pipe 38 leads to the space within the bellows 14 and the pressure of the supply is selected to be less than the pressure of the atmosphere in which the device is operating, so that normally the end face 16a of the member 16 bears on the end wall 11 of the mounting body.

If in attempting to move the object gripped by the claws 20, 21 in the upward direction as viewed in the figure, the loads experienced (which loads are transmitted through the abutment surfaces 21b, 21c, 23b, 23c to the disc 18 and member 16) become excessive due, for instance, to the object being wedged or stuck in position, then the member 16 moves away from the mounting body so bringing the spherical surface on the head 30a of the hollow boss 30 into contact with the spherical surface 12a on the hollow boss 12 and cutting off the flow of pressure fluid from within the bellows 14 to the outlet pipe 31. The outlet pipe 31 may lead to a flow-indicating device, and so an indication of excessive loading of the gripping device is obtained. If the loads experienced are normal then the flow of pressure fluid to the outlet pipe 31 is continuous, since the end face 16a of the member 16 will remain in contact with the end wall 11 of the mounting body and the head 30a of the boss 30 will be clear of the spherical surface 12a.

The inlet pipe 28 and outlet pipes 29 and 31 are made of helical form to accommodate the movement of the parts 16, 18 relative to the mounting body.

Figure 2:
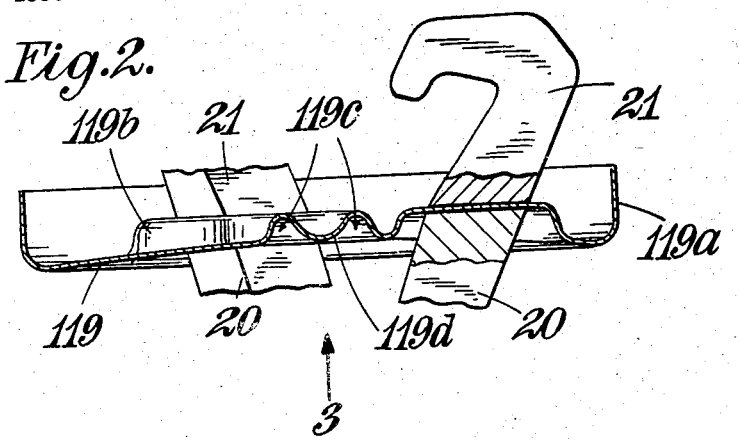
Figure 2 is a corresponding view of a second form of part of the gripping device.
Figure 3:
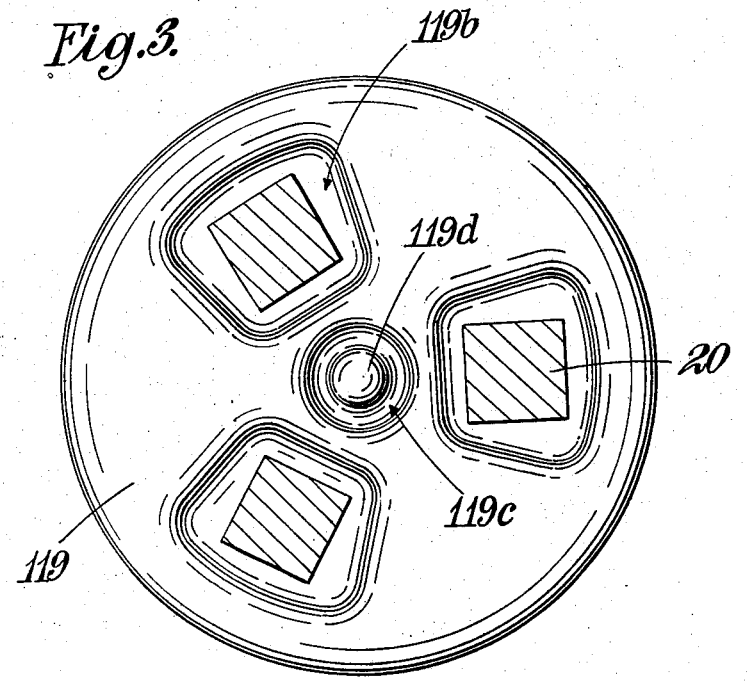
Figure 3 is a view in the direction of arrow 3 on Figure 2.

Referring now to Figures 2 and 3, there is illustrated another form of the resiliently flexible disc. In this form, the disc 119 is generally of dished form and has a peripheral flange 119a by which it is attached to the member 16. The disc is formed with a series of inward depressions 119b, one for each claw 20, 21, the bottoms of the depressions being flat and having the claw parts 20, 21 brazed to them. The disc 119 is also formed at its centre with an annular depression 119c which leaves a central domed projection 119d to which the parts 25, 26 are attached in a similar manner to that shown in Figure 1. It will be seen that parts of the disc 119 joining the main portion thereof to the flange 119a and the bottom of the depressions 119b are well radiussed and it has been found that with this form of disc, opening out the outer ends of the claws is effected mainly by deformation of the radiussed portion of the disc joining the flange 119a to the main portion, and the portions of the disc between the depressions 119b and the annular depression 119c. There is no substantial deformation of the flat bottoms of the depressions 119b.

Figure 4:
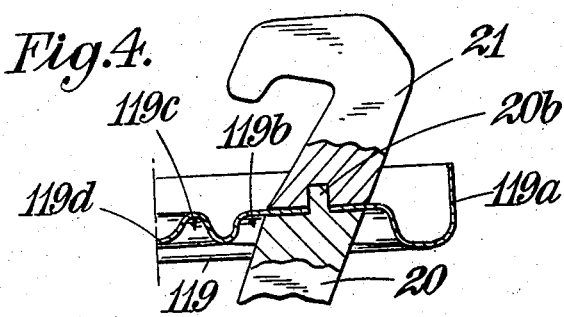
Figure 4 is a second form of another part of the device.

Referring now to Figure 4, there is shown an alternative way of securing the claw parts 20, 21 to the disc. The claw part 20 is formed with a peg-like projection 20b which extends through the disc into a socket in the part 21 and the claw parts 20, 21 and disc are brazed together.

The gripping device above described is especially suitable for use in manipulating objects by remote control in chemical apparatus in which the device has to operate in a corrosive medium, such as for example molten sodium. The formation of the claws in two parts may avoid the necessity of forming holes in the disc 19 for the passage of the claws. Furthermore, it will be appreciated that the device has no parts having sliding or similar frictional contact exposed to the medium in which the device is immersed.

I claim:

1. A gripping device comprising a chamber having a rigid annular wall structure and a resiliently-flexible, dished wall secured by its edge to said annular wall, and a plurality of claws rigidly secured to the dished wall at positions offset from and angularly spaced about the centre of the dished wall, said claws extending externally of the chamber generally in the direction of the normal to the dished wall at its centre when the wall is concave outwards, and said claws having gripping portions at their free ends, conduit means leading to the chamber, the conduit means conveying to the chamber a fluid under a pressure different from the pressure externally of the chamber whereby when the pressure within the chamber is less than the external pressure by a predetermined amount the dishing of the wall is concave outwards, and when the pressure within the chamber exceeds the external pressure by a predetermined amount the dished disc is deformed to reduce its outward concavity and the claws are displaced angularly in a sense away from said normal.

2. A gripping device as claimed in claim 1, wherein each claw is made in two parts which are secured as by brazing to the opposite surfaces of the dished disc.

3. A gripping device as claimed in claim 2, wherein one claw part is provided with a peg-like projection which extends through the disc to engage a socket in the other claw part.

4. A gripping device as claimed in claim 1, wherein the dished disc is provided with a flat-bottomed depression at each of the points of attachment of the claws and centrally with an annular depression and also comprises a peripheral flange by which the disc is secured to the rigid wall structure, and the flange and depressions are joined to the main portion of the disc through radiussed joints.

5. A gripping device as claimed in claim 1, comprising a valve member carried by the flexible wall and controlling a pressure fluid outlet to a flow-indicating device.

6. A gripping device as claimed in claim 4, wherein said valve parts on the rigid wall structure and mounting body reduce the restriction to flow through said outlet from within the flexible bellows when the abutment surfaces on the wall structure and mounting body separate.

7. A gripping device as claimed in claim 1 and further comprising a mounting body, said mounting body having an abutment surface facing in the direction of application of the load and said rigid wall structure of the chamber having an abutment surface facing in the opposite direction, a flexible bellows, conduit means leading to the interior of the bellows and conveying thereto a fluid at a pressure lower than the pressure of the atmosphere in which the device is operating, said flexible bellows being connected to the mounting body and rigid wall structure and holding said abutment surfaces in contact and permitting separation thereof when the load becomes excessive.

8. A gripping device as claimed in claim 7 comprising a pressure fluid outlet from within said bellows, valve means controlling flow through said outlet, said valve means having co-operating parts on said rigid wall structure and mounting body which are moved relatively to each other and vary the restriction to flow through said outlet when the abutment surfaces on said rigid wall structure and mounting body move relatively to each other.

9. A gripping device as claimed in claim 1, wherein the claws have portions extending within the chamber, said claw portions having abutment faces directed towards the dished wall and said rigid annular wall structure having oppositely facing abutment faces, said abutment faces on the claw portions coming into engagement with said oppositely facing abutment surfaces when the dished wall is moved to the "convex outward" position to transmit loads along the line of the normal to the rigid wall structure of the chamber.

10. A gripping device as claimed in claim 9, wherein the portions of the claws within the chamber are hooked at their ends to afford the abutment surfaces of these portions, and the rigid wall structure includes a rigid wall opposite the dished wall and having a central projection with an annular flange affording the co-operating abutment surfaces, the hooked ends coming into abutment with the flange when the dished disc is deformed from being concave outwards towards being convex outwards.

11. A gripping device as claimed in claim 10, comprising a pressure fluid outlet in said central projection, the outlet leading from the chamber to a fluid flow indicating device, and a valve member carried by the dished disc and adapted to co-operate with said outlet to close it when the dished disc is concave outwards and to uncover said outlet when the dished disc is deformed towards being convex outwards.

No references cited.